(12) United States Patent
Ellison et al.

(10) Patent No.: US 6,234,529 B1
(45) Date of Patent: May 22, 2001

(54) SEAT BELT ROUTING VIA ROOF MOUNT

(75) Inventors: Terrie Ellison, Columbus; Hironao Ito, Dublin; Eric Boettcher, Columbus, all of OH (US)

(73) Assignee: Honda Giken Kogyo Kabukshiki Kaisha, Tokyo (JP)

( * ) Notice: Subject to any disclaimer, the term of this patent is extended or adjusted under 35 U.S.C. 154(b) by 0 days.

(21) Appl. No.: 09/470,052

(22) Filed: Dec. 22, 1999

(51) Int. Cl.[7] ............... B60R 22/24; B62D 25/06
(52) U.S. Cl. ........................... 280/808; 296/210
(58) Field of Search .................... 280/808, 807, 280/801.1; 296/210, 214

(56) References Cited

U.S. PATENT DOCUMENTS

| | | | |
|---|---|---|---|
| 3,810,657 | * 5/1974 | Campbell | 280/808 |
| 3,829,123 | * 8/1974 | Holka | 280/808 |
| 4,167,277 | * 9/1979 | Rumpf | 280/807 |
| 4,400,013 | * 8/1983 | Imai | 280/808 |
| 4,915,413 | 4/1990 | Meyer . | |
| 4,988,121 | 1/1991 | Yoshii . | |
| 5,207,453 | 5/1993 | Stedman et al. . | |
| 5,253,896 | 10/1993 | Verbeski . | |
| 5,265,909 | 11/1993 | Verbeski . | |
| 5,487,564 | 1/1996 | Fueller et al. . | |
| 5,590,907 | * 1/1997 | McQueen, II et al. | 280/808 |
| 5,671,968 | 9/1997 | Masuda et al. . | |
| 5,957,499 | * 9/1999 | Kempf | 280/801.1 |

* cited by examiner

Primary Examiner—Peter C. English
(74) Attorney, Agent, or Firm—Rankin, Hill, Porter & Clark LLP

(57) ABSTRACT

A shoulder belt is provided for a center seat in a vehicle. The belt extends from a retractor mounted to a frame in an upper rear corner of the vehicle. The belt is routed through a belt guide mounted to a roof arch above the seat. The belt extends from the retractor to the belt guide in a space between the roof and roof liner. The belt then extends through the belt guide into the passenger compartment. The belt has a detachable tongue secured in a detachable anchor so that the belt can be released and retracted into a storage compartment above the seat.

15 Claims, 3 Drawing Sheets

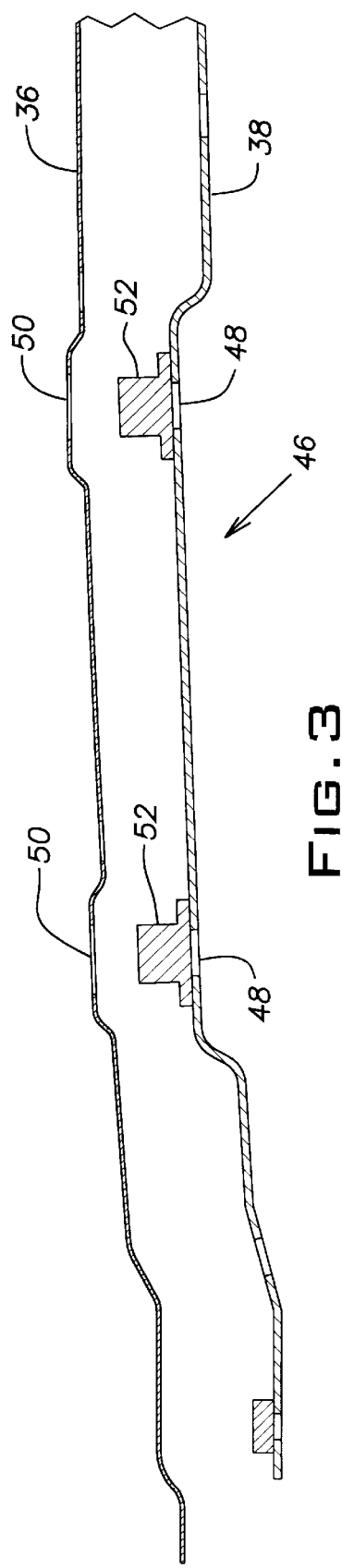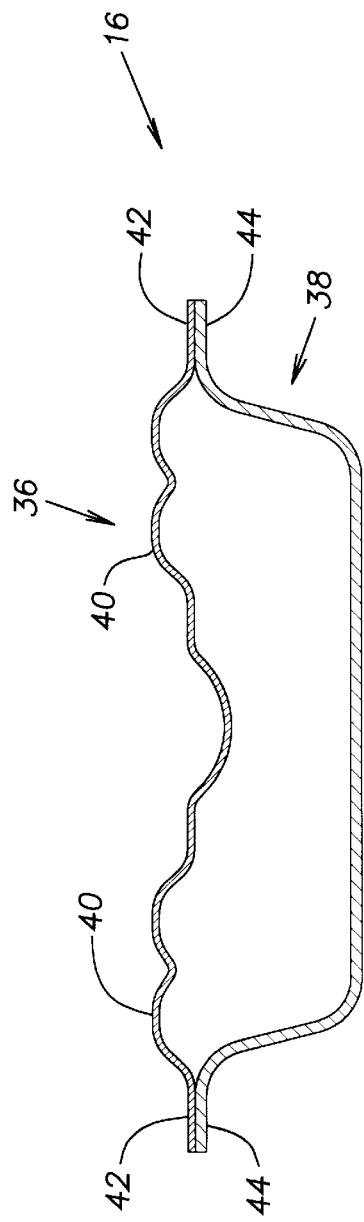

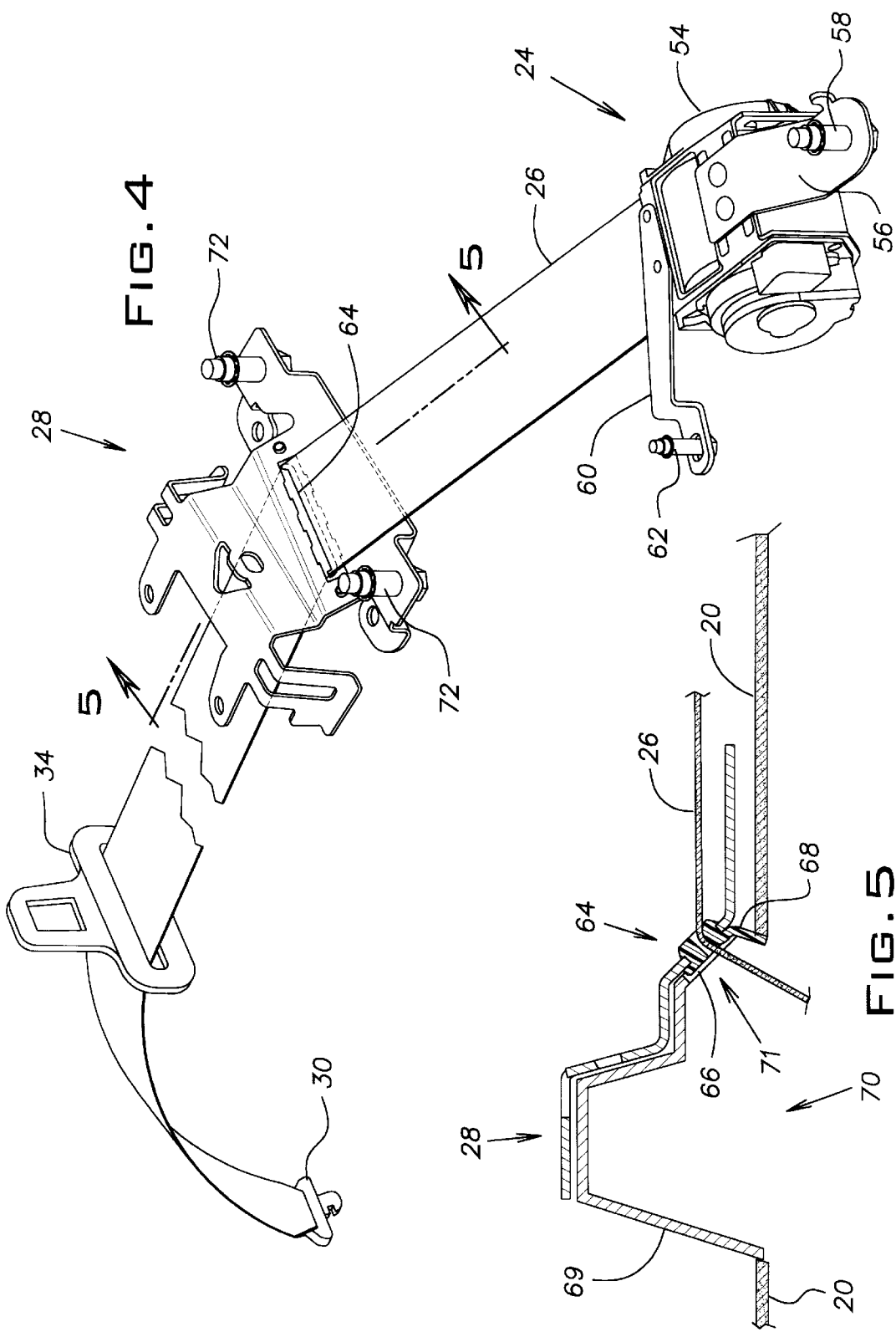

SEAT BELT ROUTING VIA ROOF MOUNT

CROSS-REFERENCE TO RELATED APPLICATIONS Not Applicable

STATEMENT REGARDING FEDERALLY SPONSORED RESEARCH OR DEVELOPMENT

Not Applicable

BACKGROUND OF THE INVENTION

This invention relates generally to the field of vehicle restraints and specifically to a shoulder belt for a center seat.

Most passenger vehicles are provided with a three-point restraint for each seat. The restraint normally includes a shoulder belt that is extendable from a retractor. The retractor is normally mounted to a pillar or other structural member on the side of the vehicle adjacent the seats. For center seats there is no adjacent pillar to which the retractor can be mounted. In some cases, a two-point harness is used. When a three-point harness is used, the retractor for the center seat is mounted to the roof above the seat, to the floor behind the seat, or to the seat itself. Because of the size of the retractor, these locations can interfere with storage space or other functional or aesthetic features of the interior of the vehicle.

BRIEF SUMMARY OF THE INVENTION

The present invention provides a restraint assembly including a vehicle frame and a retractor mounted to the frame. A belt guide having a passage is mounted to the frame. A belt is extendable from the retractor and retractable by the retractor. The belt extends through the belt guide passage.

The frame includes a roof arch extending generally laterally across the vehicle. The belt guide is mounted to the roof arch. The roof arch includes a first component having a U-shaped cross section and a second component secured thereto. The roof arch components have outwardly extending flanges and the flanges of the components are mated to define a cavity between the components. The first component is a lower component provided with a recessed area and the belt guide is mounted in the recessed area.

A seat is disposed substantially below the roof arch. A latch has first and second latching portions, wherein the first portion is mounted adjacent the seat and the second latch portion is attached to the belt such that the belt can be extended from the retractor to secure the second latch portion to the first latch portion. A storage compartment for the second latching portion is disposed adjacent the belt guide. A roof is disposed above the roof arch. A roof liner is disposed below the roof arch and spaced from the roof. A portion of the belt extending between the retractor and the belt guide is disposed between the roof and the roof liner.

The frame includes a generally vertical pillar and a generally horizontal and forwardly extending stiffener. The retractor is mounted to at least one of the pillar and the stiffener. The frame includes a roof arch extending generally laterally from the stiffener and the belt guide is mounted to the roof arch. The roof arch is spaced forwardly from the pillar.

The belt guide includes a slot fitted with a grommet and the belt travels through the slot such that the grommet provides a bearing surface for the belt. The belt guide is spaced from the retractor. The belt guide is mounted separately from the retractor.

According to another aspect, the invention provides a restraint assembly for a vehicle having a frame including a roof arch extending laterally across the vehicle. The restraint assembly includes a retractor mounted to the frame; a belt guide secured to the roof arch and having a passage; and a belt extending from the retractor and through the belt guide passage. The frame includes a generally vertical pillar and a generally horizontal stiffener. The retractor is mounted to at least one of the pillar and the stiffener.

BRIEF DESCRIPTION OF THE SEVERAL VIEWS OF THE DRAWING

FIG. 2 shows a section view of a roof arch according to the invention taken from line 2—2 of FIG. 1;

FIG. 3 shows a section view of a roof arch according to the invention taken from line 3—3 of FIG. 1;

FIG. 4 shows an isometric view of the belt and associated mounting and operation components according to the invention; and FIG. 5 shows a section view of a belt guide according to the invention taken from line 5—5 of FIG. 4.

DESCRIPTION OF THE INVENTION

Figure 1:
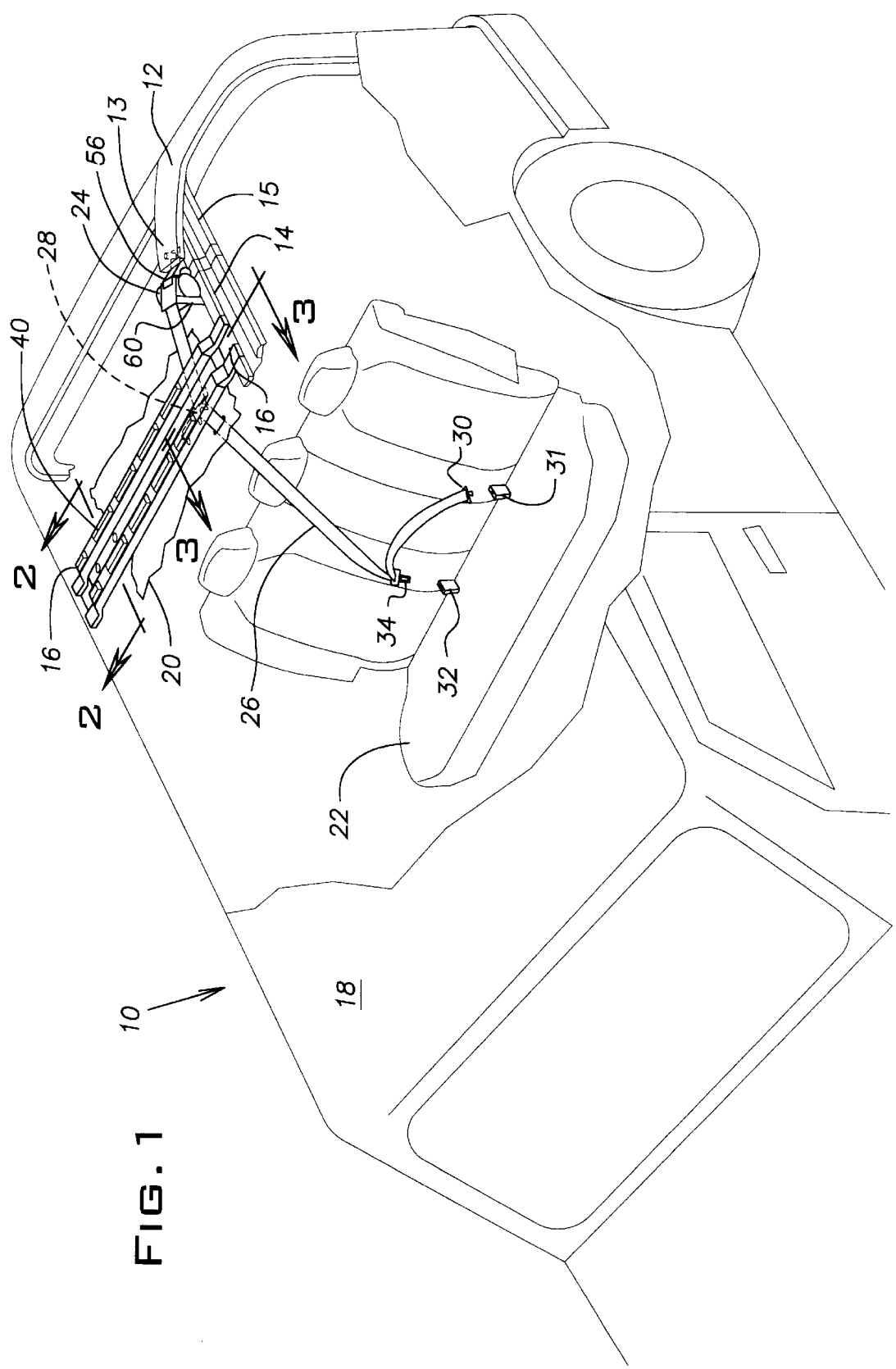
FIG. 1 shows an isometric view of a vehicle partially cut away to reveal a seat belt assembly according to the invention.

Referring to FIG. 1, a vehicle 10, such as an automobile having a passenger compartment, includes structural members including vertically extending pillars 12 and horizontally extending stiffeners. The upper end of the pillar includes a gutter upper component 13. The stiffeners include components such as inside rails 14 and outside rails 15. The pillars 12 are located at corners of the passenger compartment and, in some cases, also at the side of the passenger compartment. The stiffeners extend between pillars to form a network of structural members defining the passenger compartment. The following description makes particular reference to the left rear pillar 12 and the inside rail component 14 of the left upper stiffener, which are joined at an upper left rear corner of the vehicle 10. Roof arches 16 extend laterally between the stiffeners above the passenger compartment. The pillars, stiffeners, and roof arches are all made of a rigid material, such as steel.

A roof 18 is disposed above and supported by the roof arches 16. A roof liner 20 is disposed below and supported by the roof arches 16. The roof liner 20 is spaced from the roof 18 and forms an interior ceiling of the passenger compartment. The roof 18 and roof liner 20 are partially cut away in FIG. 1 to reveal the interior of the passenger compartment. Seats 22 are provided in the passenger compartment. Particular reference is made to a center seat in a second row of a vehicle having two or three rows of seats.

A seat belt retractor 24, commonly known as an "ELR", is adapted for retracting a belt 26. The belt 26 extends from the retractor through a belt guide 28 to a detachable tongue 30. The detachable tongue 30 is releasably secured to a detachable anchor 31. The detachable anchor 31 is secured to a normally immovable structure. For example, the anchor 31 can be bolted to the floor of the vehicle. A belt fastener includes a buckle 32 secured to a normally immovable structure and a tongue 34 secured to the belt 26. The tongue 34 is disposed between the belt guide 28 and the detachable tongue 30 and can be movable on the belt 26.

Referring to FIGS. 1–3, one of the roof arches 16 is particularly adapted for supporting the belt guide 28. In the arrangement shown in FIG. 1, reference is made to the roof arch 16 above and slightly behind the center seat 22 in the second row. The roof arch 16 is formed from an upper roof arch component 36 and a lower roof arch component 38. The upper component 36 is a generally rectangular member having multiple rectangular indents 40. The indents 40 are provided to mate with corresponding structure on the lower face of the roof. Mastic adhesive is applied between the upper component and the roof. Outwardly projecting flanges 42 are provided along opposite edges of the upper component 36.

The lower component 38 is a generally rectangular member having a U-shaped cross section. The lower component is substantially similar to existing roof arches except that it is substantially thicker. Outwardly projecting flanges 44 are provided along opposite edges of the lower component. The flanges 42, 44 of the upper and lower components are mated and joined, for example by welding, to form the roof arch. Thus, the roof arch forms a hollow, D-shaped beam in which the upper component reinforces the lower component.

The lower component 38 includes a recess 46 near one end. The recess makes the U shape of the lower component shallower such that the bottom of the recess is higher than the bottom of the remaining part of the lower component. Two holes 48 are provided through the recess 46. Corresponding holes 50 can be provided in the upper portion above the lower holes 48. A fastener 52, such as a nut, is provided adjacent each of the holes 48.

The roof arch 16 is formed by stamping or die casting steel. The roof arch is secured to respective stiffeners at its ends, for example by welding each end of the roof arch to a roof ditch portion of the roof and inside rails of the stiffeners.

Referring to FIG. 4, the retractor 24 includes a housing 54 containing a retraction mechanism onto which the belt 26 is wound. A rear mounting bracket 56 extends rearwardly from an upper surface of the retractor housing 54 and is provided with a hole for a mounting bolt 58. The rear bracket is offset so that the hole is displaced downwardly from the upper surface of the bracket 56. A side mounting bracket 60 extends laterally from the upper surface of the retractor housing 54 and is provided with a hole for a mounting bolt 62. As shown in FIG. 1, the retractor 24 is mounted in the vehicle by securing the retractor mounting bolts 58, 62 to structural members of the vehicle. For example, the retractor 24 can be mounted to a pillar 12 and/or a stiffener component, such as the inside rail 14. Intrusion of the retractor into the passenger compartment should be minimized. In FIG. 1, the rear bracket 56 is secured to the gutter upper component 13 of the pillar 12 at the left rear corner of the vehicle. The side bracket is mounted to the rear inside rail 14 at the left upper corner of the vehicle. The opening in the housing 54 from which the belt 26 extends is located above the roof liner 20. The retractor can be concealed by the roof liner and/or a separate cover.

Referring to FIGS. 4 and 5, the belt guide 28 includes a slot 64 fitted with a grommet 66. The slot 64 defines a passage through which the belt 26 passes. The passage can be a closed slot, open notch, or other structure on which the belt travels. The grommet 66 provides bearing surface made of a smooth, low friction material, such as nylon. The grommet 66 includes a downwardly projecting finger 68 that maintains the roof liner 20 spaced from the belt guide 28. The roof liner is provided with an opening 70, adjacent the belt guide slot 64, through which the belt passes. A storage compartment 69, such as molded plastic insert, is disposed in the opening 70 and fastened to the belt guide 28. A closable cover, such as a swinging or sliding door, can be provided for the storage compartment 69. The storage compartment insert 69 includes an opening 71 corresponding with the belt guide slot 64 and through which the belt passes. The belt guide 28 and retractor 24 are mounted separately so that the belt guide can be mounted as required by the seat location and the retractor can be mounted as required by aesthetics and to maximize passenger compartment space and utility. Although mounted separately, intervening structure can be provided between the retractor and belt guide, such as a sheath covering the belt.

Referring to FIGS. 1, 3, and 4, The belt guide 28 is mounted to the roof arch 16 by a pair of bolts 72. The bolts 72 project through the holes 48 in the lower arch component 38 and are secured by the fasteners 52 so that the belt guide 28 is mounted in the recess 46. In the mounted position of the belt guide 28 the slot 64 is inclined and disposed below the recessed part of the roof arch 16. The belt guide 28 provides for redirection of the belt and transmits some of the forces from the belt to the roof arch 16. The roof arch is sufficiently strong to absorb forces placed on the belt guide by the belt. The belt guide is located so that the belt 26 passes across a passenger's body from shoulder to hip when secured by the buckle 32. That is, the belt guide is located above and laterally displaced from the seat for which the belt is provided.

The belt 26 travels from the retractor 24, between the roof 18 and roof liner 20 to the belt guide 28. At the belt guide, the belt travels below the recess 46 in the roof arch, through the belt guide slot 64, and through the roof liner opening 70. The end of the belt is secured to the detachable tongue 30, which is retained in the detachable anchor 31. Thus, the belt extends from the belt guide 28 to the floor of the vehicle inside the passenger compartment. Insertion of the tongue 34 in the buckle 32 secures the belt around a passenger in the seat.

When the seat is folded down to increase the cargo capacity of the passenger compartment, the detachable tongue 30 is released from the detachable anchor 31. The retractor 24 then further retracts the belt 26 so that the tongue 34 and detachable tongue 30 are held in the storage compartment 69. Alternatively, the belt 26 can be formed by a shoulder belt detachable from a tongue of a lap belt. The lap belt is releasably attached to the floor of the vehicle. In this case, when the seat is folded down to increase the cargo capacity of the passenger compartment, the shoulder belt is detached from the lap belt and retracted to the roof liner storage compartment.

The present disclosure describes several embodiments of the invention, however, the invention is not limited to these embodiments. Other variations are contemplated to be within the spirit and scope of the invention and appended claims.

What is claimed is:
1. A restraint assembly comprising:
   a vehicle frame, said frame including a roof arch and a pillar, said pillar extending generally vertically while said roof arch extending relatively transverse to a length direction of the vehicle frame;
   a retractor mounted to the frame at a location spaced from the roof arch;
   a belt guide having a passage and mounted to the roof arch;
   a seat disposed relatively beneath said roof arch;
   a belt extendable from the retractor and retractable by the retractor wherein the belt extends through the belt guide passage; and a latch having first and second latch portions, said first latch portion being mounted adjacent the seat and the second latch portion being attached to the belt such that the belt can be extended from the retractor to secure the second latch portion to the first latch portion.

2. The restraint assembly according to claim 1 wherein the roof arch includes a first component having a U-shaped cross section and a second component secured thereto.

3. The restraint assembly according to claim 2 wherein the roof arch components have outwardly extending flanges and the flanges of the components are mated to define a cavity between the components.

4. The restraint assembly according to claim 2 wherein the first component is a lower component provided with a recessed area and the belt guide is mounted in the recessed area.

5. The restraint assembly according to claim 1 further comprising a storage compartment for the second latch portion disposed adjacent the belt guide.

6. The restraint assembly according to claim 1 further comprising:
   a roof disposed above the roof arch; and
   a roof liner disposed below the roof arch and spaced from the roof, wherein a portion of the belt extending between the retractor and the belt guide is disposed between the roof and the roof liner.

7. The restraint assembly according to claim 1 wherein the frame further includes a generally horizontal and lengthwise-extending stiffener and the retractor is mounted to at least one of the pillar and the stiffener.

8. The restraint assembly according to claim 7 wherein the roof arch extends generally laterally from the stiffener.

9. The restraint assembly according to claim 1 wherein the roof arch is spaced forwardly from the pillar.

10. The restraint assembly according to claim 1 wherein the belt guide includes a slot fitted with a grommet and the belt travels through the slot such that the grommet provides a bearing surface for the belt.

11. The restraint assembly according to claim 1 wherein the belt guide is spaced from the retractor.

12. The restraint assembly according to claim 1 wherein the belt guide is mounted separately from the retractor.

13. A restraint assembly for a vehicle having a frame including a generally vertical pillar, a generally horizontal stiffener, and a roof arch, said roof arch extending laterally across the vehicle, the assembly comprising:
   a retractor mounted to at least one of said pillar and said stiffener;
   a belt guide secured to the roof arch and having a passage; and
   a belt extending from the retractor and through the belt guide passage.

14. A restraint assembly for a vehicle comprising:
   a pillar extending substantially vertically at a rear corner of the vehicle;
   a pillar stiffener extending substantially horizontally forward from the pillar along a top corner of the vehicle;
   a retractor mounted to at least one of the pillar and the pillar stiffener;
   a roof arch extending substantially laterally across the vehicle from the pillar stiffener;
   a roof disposed above the roof arch;
   a roof liner disposed below the roof arch and spaced from the roof;
   a belt guide secured to the roof arch, wherein the belt guide includes a passage provided with a bearing surface;
   a seat disposed generally below the roof arch;
   a latch having first and second latch portions, wherein the first portion is mounted adjacent the seat; and
   a belt extending from the retractor, between the roof and the roof liner, and through the belt guide passage, wherein the second latch portion is attached to the belt such that the belt can be extended from the retractor to secure the second latch portion to the first latch portion.

15. A restraint assembly for a vehicle comprising:
   a pillar extending substantially vertically at a rear corner of the vehicle;
   a pillar stiffener extending substantially horizontally forward from the pillar along a top corner of the vehicle;
   a retractor mounted to the pillar stiffener adjacent the pillar,
   a roof arch extending laterally across the vehicle from the pillar stiffener, the arch including a lower component having a U-shaped cross section and outwardly extending flanges and an upper component having outwardly extending flanges, wherein the flanges of the upper and lower portions are mated to define a cavity between the upper and lower portions and the lower portion is provided with a recessed area;
   a roof disposed above the roof arch;
   a roof liner disposed below the roof arch and spaced from the roof, wherein the roof liner is provided with an opening;
   a belt guide disposed in the recessed area and secured to the roof arch, wherein the belt guide includes a slot fitted with a grommet;
   a seat disposed generally below the roof arch;
   a latch having a tongue and a buckle, wherein the buckle is mounted adjacent the seat; and
   a belt extending from the retractor, between the roof and the roof liner, through the belt guide slot, through the roof liner opening and secured adjacent the seat, wherein the belt bears on the grommet and the latch tongue is attached to the belt such that the belt can be extended from the retractor to secure the tongue to the buckle.

* * * * *

UNITED STATES PATENT AND TRADEMARK OFFICE
CERTIFICATE OF CORRECTION

PATENT NO. : 6,234,529 B1
DATED : May 22, 2001
INVENTOR(S) : Ellison et al.

Page 1 of 1

It is certified that error appears in the above-identified patent and that said Letters Patent is hereby corrected as shown below:

Column 3,
Line 16, delete "lower" and insert -- upper --.

Column 5,
Line 33, (claim 9, line 1), delete "claim 1" and insert -- claim 8 --.

Signed and Sealed this

Twenty-seventh Day of November, 2001

*Attest:*

*Attesting Officer*

NICHOLAS P. GODICI
*Acting Director of the United States Patent and Trademark Office*